(No Model.)  6 Sheets—Sheet 1.
C. CROSS.
LOOM.
No. 253,010. Patented Jan. 31, 1882.
FIG: 1.
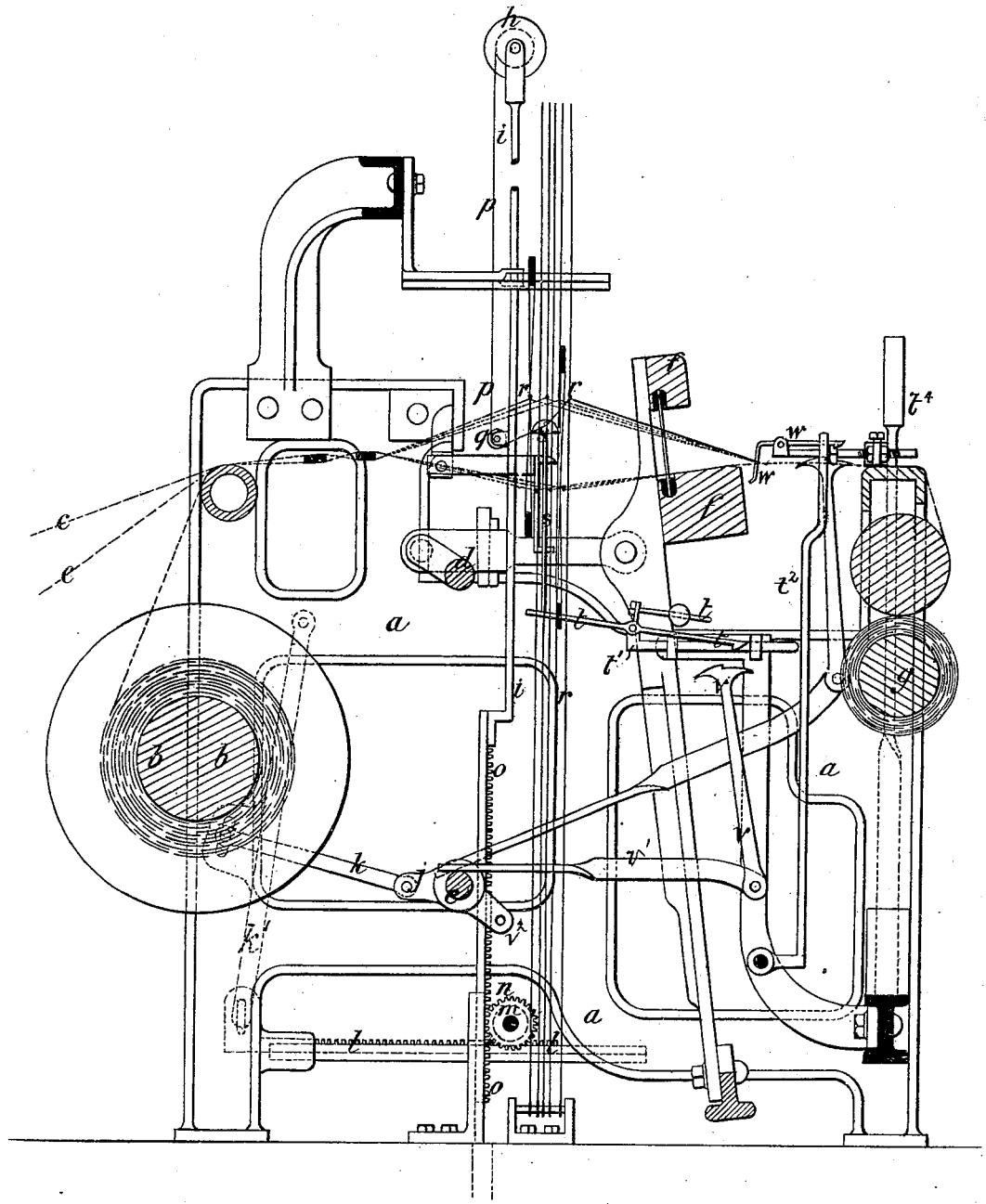
WITNESSES
Henry Fulenrider,
Henry Howson Jr.
INVENTOR
Christopher Cross
by his Attorneys
Howson and Son (No Model.) 6 Sheets—Sheet 2.
C. CROSS.
LOOM.
No. 253,010. Patented Jan. 31, 1882.
FIG: 2. FIG: 3.
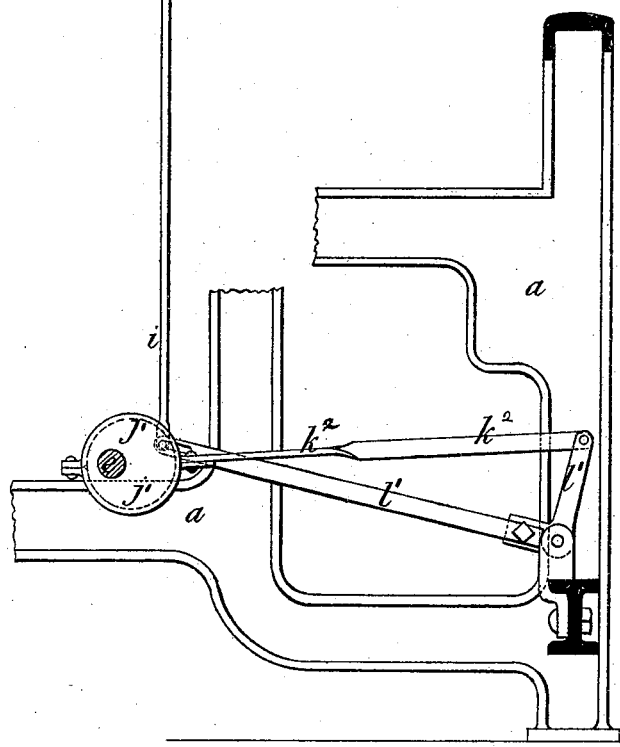
WITNESSES
Henry Fulenwider.
Henry Howson Jr.
INVENTOR
Christopher Cross,
by his Attorneys,
Howson and Son (No Model.)

6 Sheets—Sheet 3.

C. CROSS.
LOOM

No. 253,010. Patented Jan. 31, 1882.

WITNESSES
Henry Fulenwider.
Henry Howson Jr.

INVENTOR
Christopher Cross
by his attorneys
Howson and Son (No Model.) 6 Sheets—Sheet 4.
C. CROSS.
LOOM.
No. 253,010. Patented Jan. 31, 1882.
FIG: 5.
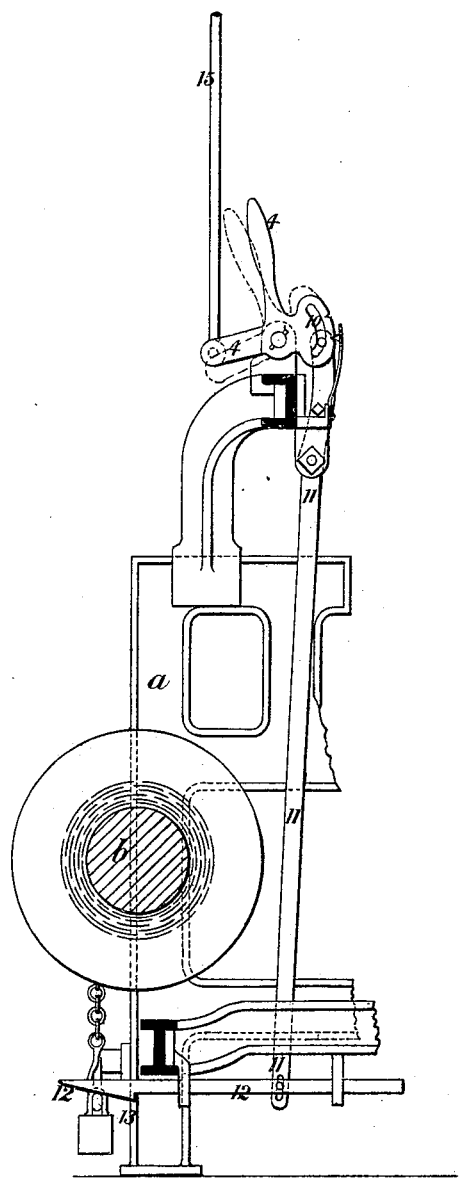
FIG: 7.
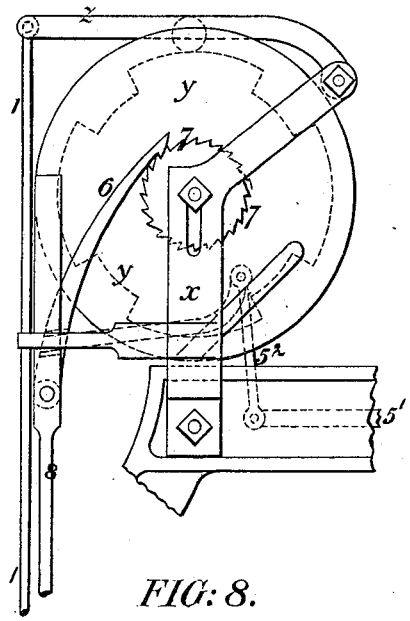
FIG: 8.
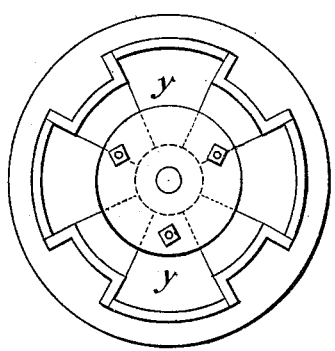
WITNESSES
Henry Fulenwider.
Henry Howson Jr.
INVENTOR
Christopher Cross
by his attorneys
Howson and Son

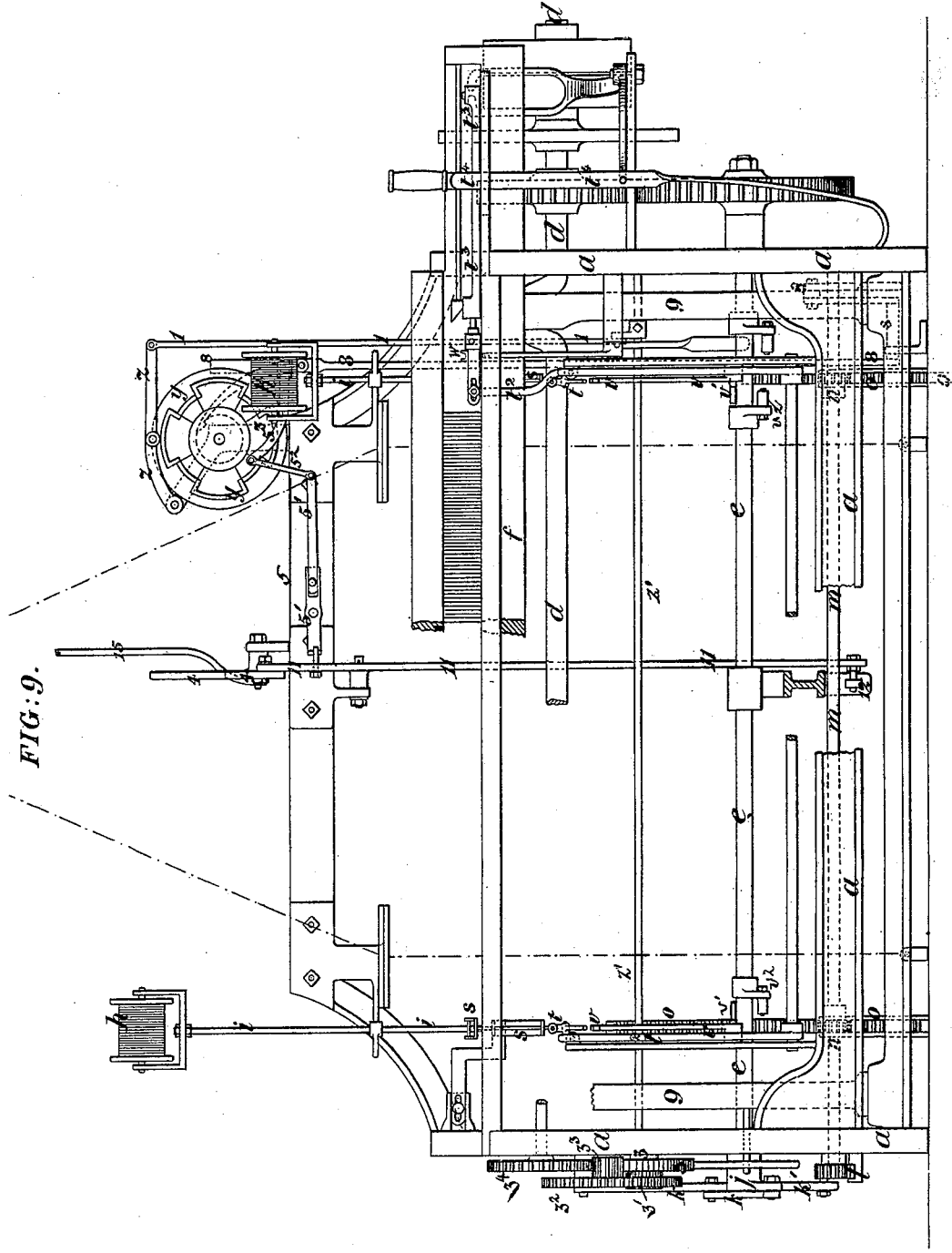

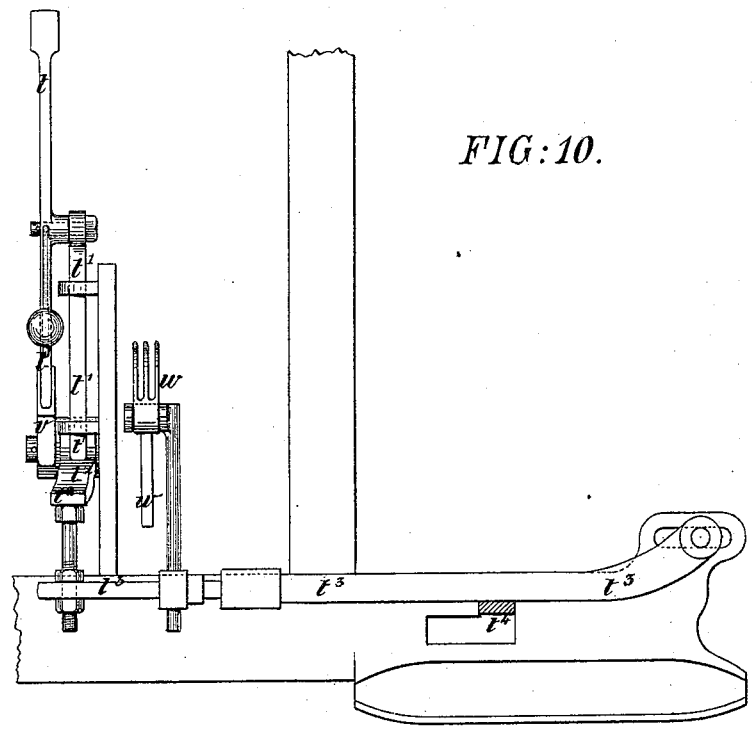
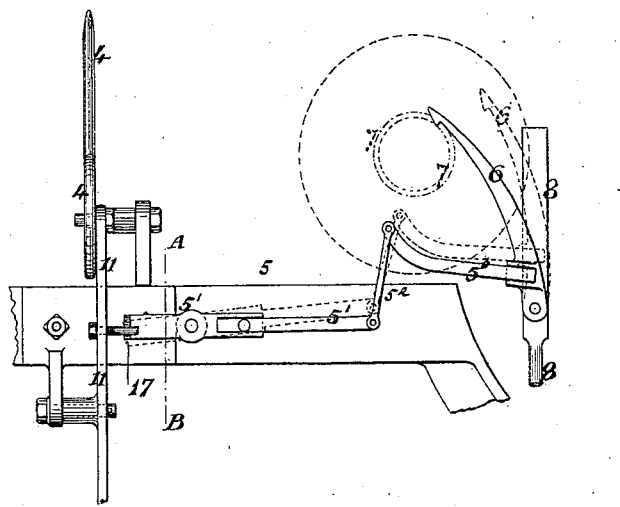
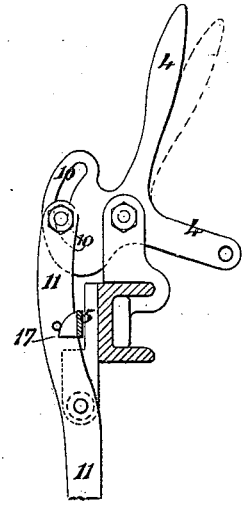

United States Patent Office.

CHRISTOPHER CROSS, OF MANCHESTER, COUNTY OF LANCASTER, ENGLAND.

LOOM.

SPECIFICATION forming part of Letters Patent No. 253,010, dated January 31, 1882.

Application filed May 17, 1880. (No model.) Patented in England March 9, 1880.

*To all whom it may concern:*

Be it known that I, CHRISTOPHER CROSS, a subject of the Queen of Great Britain and Ireland, and residing at Manchester, in the county of Lancaster, England, have invented Improvements in Looms for weaving fabrics called "Loongees" and other similar ornamental fabrics, of which the following is a specification.

My invention relates to improvements in power-looms for weaving certain kinds of fabrics with ornamental colored borders along each selvage or border and ornamental headings across the piece, more especially at the ends. The kinds of fabrics here referred to are the East Indian fabrics called, in the native Indian terms, "loongees," "dhooties," while the borders or headings of these fabrics are called "kincobs" or "daggarees," the latter being a colored vandyked border, while the "kincob" is a peculiar kind of double-faced border or heading.

Certain improvements in looms for this class of weaving are described in the British Patent No. 1,187 of 1876, granted to J. E. Simpson and myself, and also in the specifications of British Provisional Protections Nos. 540 and 3,686 of 1878, granted to myself.

The objects of my present improvements are to construct the loom so as to insure the accurate and positive delivery of the lap-weft or whip threads for forming the colored borders, and to cause the immediate stoppage of the loom when any of these lap-threads break. These objects I attain in the manner which I will now proceed to describe, reference being had to the accompanying drawings, in which—

Figure 6:
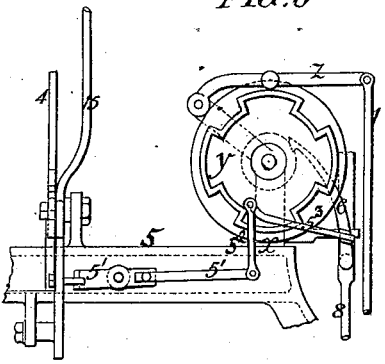
Figure 4:
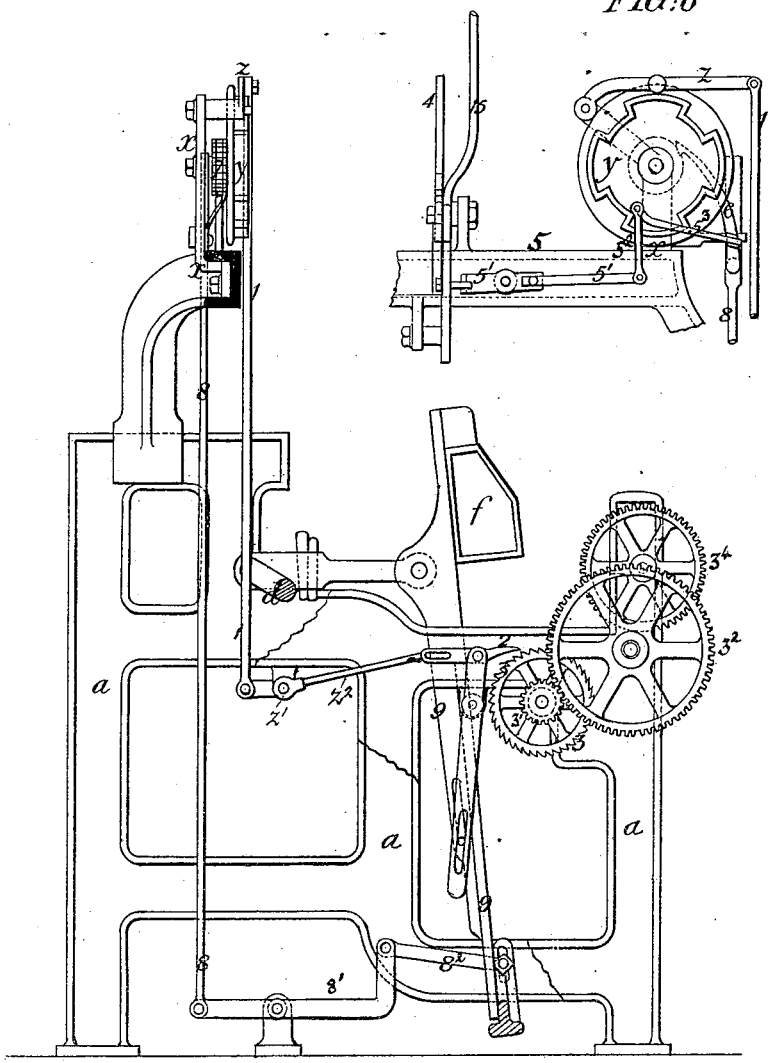

Figure 1, Sheet 1, is a vertical section of a loom with a part of my improvements applied thereto; Fig. 2, Sheet 2, a view of a modification; Fig. 3, detached views of a part of Fig. 1; Fig. 4, Sheet 3, a view partly in section of the loom with other features of my improvements; Fig. 5, Sheet 4, a vertical section of a part of the loom; Fig. 6, Sheet 3, a front view of a portion of the loom illustrated in Fig. 4; Figs. 7 and 8, Sheet 4, back and front views, respectively, of the cam for controlling the take-up, drawn to an enlarged scale, the former showing also devices for operating the cam; Fig. 9, Sheet 5, a front view, with parts of the loom removed, showing the several features of my invention; Fig. 10, Sheet 6, a plan view of a portion of the loom indicating the stopping mechanism; Fig. 11, a view showing the cam-operating devices for the take-up motion; and Fig. 12, a section on the line A B, Fig. 11.

The daggaree or vandyked border is formed by weaving into the warps at the edge a colored "lap-weft" or whip thread, which is caught by the shuttle-weft and drawn into the shed of the warp-threads a certain regulated distance from each selvage. The positive and accurate delivery of this colored lap or whip thread in the required lengths at each pick is regulated by means of the devices illustrated in Figs. 1, 2, 3, and 9, in which $a$ represents the frame of the loom; $b$, the ordinary warp-beam for the central portion of the fabric; $c\,c$, the border-warp wound on separate beams, (not shown for the want of space;) $d$, the crank-shaft; $e$, the tappet-shaft; $f$, the lathe or lay, and $g$ the cloth-roller.

The lap-weft or whip threads are wound on bobbins $h\,h$, which are mounted one on each side of the loom, Fig. 9, on vertical sliding bars or rods $i\,i$, the latter having a rising and falling motion imparted to them, so as to draw off from the bobbins $h\,h$ the maximum quantity of lap-weft required at each pick. This vertically-reciprocating motion may be imparted to the rods in any convenient manner. In Fig. 1 it is shown as derived from a crank, $j$, on the tappet-shaft $e$, which, by means of a connecting-rod, $k$, and lever $k'$, hung at its upper end to the frame, imparts a horizontal reciprocating motion to a toothed rack, $l$. This toothed rack gears into a pinion on the shaft $m$, having a second pinion, $n$, gearing into a rack, $o$, secured to or forming part of the lower end of the rods $i\,i$, carrying the bobbins. If preferred, however, this vertically-reciprocating motion may be imparted to the rods, as illustrated in Fig. 2, by means of an eccentric, $j'$, instead of a crank, a connecting-rod, $k^2$, and bell-crank lever or levers $l'\,l'$, the long arms of which are connected to the lower ends of the rods $i$, as will be readily understood from the drawings.

In some cases a horizontal instead of a vertical to-and-fro motion may be imparted to the bobbins for delivering the lap-weft. From each bobbin $h$, in the present instance, the lap-weft $p$ passes round a small pulley, $q$, carried by the rod $i$, and between this point and the mail $r$, which lifts the thread $p\,p$, is arranged a vertical counterpoise, $s$, adapted to guides in a fixed part of the frame, and resting on the outer end of a carefully balanced and weighted lever, $t\,t$, pivoted to a sliding carriage, $t'$, on guides on a part of the frame, Figs. 1 and 10. The lap-weft $p\,p$ passes over this counterpoise $s$, which always presses upward under the action of the lever, so as to take up any slack of the lap-weft and keep it tight, except at the moment of throwing the shuttle, when the shuttle-weft laps around the lap-weft and draws the latter into the shed of the warps the required distance, and then the increased tension of the lap-weft $p$ presses down the counterpoise $s$ and gives out the exact amount of weft required. It is essential that the counterpoise should be carefully balanced, for otherwise the lap-weft would be apt to break or over-deliver itself, thus causing faults or imperfections in the pattern.

In order to insure the stoppage of the loom whenever one of the lap-wefts breaks or fails, I make use of the following mechanism: The balanced lever $t$ at the end opposite that which supports the counterpoise is provided with a hook, and immediately below the lever is a hammer, $v$, which is pivoted on the frame and has an arm, $v'$, operated by a small tappet, $v^2$, on the cam-shaft $e$, so that at each revolution the hammer will be vibrated to and fro. When a thread breaks and the hooked end of the rod $t$ falls into the path of the vibrating hammer $v$ the latter catches the hook and moves its sliding carriage $t'$ forward until it pushes against a lever, $t^2$, forming a part of the usual stop-motion employed in connection with the weft-fork $w$, Figs. 1 and 10, to shift the belt. The upper end of the lever $t^2$ moves the lever $t^3$, which, as shown in Fig. 10, bears against a spring-handle, $t^4$, operating the belt-shifter, and, throwing the handle out of its notch, shifts the belt and causes the stoppage of the loom.

By the use of the hooked lever and devices described above I can in some cases dispense with the weft-fork $w$, because if the shuttle-weft should break it will fail to draw the lap-weft into the shed, and the consequent extra slackness of the latter will allow the counterpoise $s$ to rise and produce the same effect as if the lap-weft were to break, as above described.

In making the ornamental heading across either end of the piece I use a tie-up in separate clusters; or by means of the Dobby or other similar apparatus I so shed the warp as to produce quilting, rep, damask, pile, fustian, or kincob fabrics. In order to make this heading sufficiently solid, it is at the same time necessary to decrease the speed of taking up the cloth—say to about one-fourth or one-sixth—so as to put in as much weft as possible, and to proportionately increase the weighting of the yarn-beam. For this purpose I prefer to employ the devices illustrated in Figs. 4, 5, 6, 7, 8, 9, 11, and 12 of the drawings.

Referring to Figs. 4 and 6, $x$ is a bracket secured to the frame of the loom and carrying a rotary cam, $y$, acting on a lever, $z$, Fig. 9. This lever is connected by a rod, 1, with an arm on a shaft, $z'$, extending to the taking-up gear at one end of the loom, Fig. 9, and having there an arm, $z^2$, Fig. 4, acting on the ordinary taking-up catch 2, so that when the bowl of the lever $z$ rests upon one of the risers of the cam, as illustrated in Fig. 6, the take-up catch 2 is held out of gear with the ratchet-wheel 3, and the take-up of the cloth ceases, the ratchet-wheel 3 being provided with a pinion, $3'$, geared to the wheel $3^4$ on the take-up beam through the wheel $3^2$ and pinion $3^3$, Figs. 4 and 9; but when the bowl of the said lever falls into one of the depressions of the cam the catch 2 falls into gear again and operates the take-up. This catch 2 is carried by the upper end of a lever pivoted to the frame, the other end being acted on by a projection on the lay 9, in the usual manner.

When the loom is weaving the principal portion of the fabric the cam is allowed to remain stationary, the bowl on the lever $z$ remaining in one of the depressions of the cam, so that the take-up is operated in the usual manner; but when the close heading is to be woven the operator pulls a hand-lever, 4, toward him to the position shown by full lines in Fig. 5, so as to operate the cam by the following mechanism: This hand-lever 4, which, as shown more fully in Figs. 11 and 12, is pivoted on the frame of the loom, Figs. 9 and 12, has a curved slot, 10, to which is adapted a pin on the upper end of a lever, 11, also pivoted to the frame, and this lever 11 has a pin bearing on a curved projection, 17, on the link-lever 5, as shown in Fig. 12. What I term the "link-lever" consists of a lever, $5'$, Fig. 11, pivoted to the frame, and connected by a link, $5^2$, with an arm, $5^3$, secured to a pawl, 6, pivoted to the upper end of the rod 8, which, as seen in Fig. 4, is carried by a bell-crank lever, $8'$, pivoted to a fixture on the base or frame, and connected by the link $8^2$ to the lay 9. The pawl 6 is adapted to take into the teeth of a ratchet, 7, on the back of the rotary cam $y$, Fig. 7. When the hand-lever is pulled over by the operator the pin on the lever 11, moving away from the curved projection, will allow the link-levers 5 and pawl 6 to move from the position shown by dotted lines to those shown by full lines in Fig. 11, until the pawl 6 engages with the teeth of the ratchet 7, and the vibration of the lever 8, through its connection with the lay 9, Fig. 4, causes the pawl to turn the cam $y$ the extent of one tooth at each beat up of the lay. As the risers of this cam are about twice the width of the depressions, the loom will then take up for two picks and throw the catch 2 out of gear for four picks, and so on alternately, according to the particular pattern of the cam $y$, which may be varied to suit circumstances.

It will be observed on reference to Fig. 8 that the cam $y$ is made in sections or segments, which can be put together to form any required pattern; or a pattern-chain formed of links might be employed for the same purpose.

The lower end of the lever 11 has a pin-and-slot connection with a horizontal bar, 12, having a wedge-shaped end projecting over the weighted lever 13 of the warp-beam $b$, so that when the hand-lever 4 is pulled over, as above described, this wedge-shaped end of the lever 12 will be pushed over the lever 13 and increase the strain on the yarn, and consequently the let-off will be retarded at the same time as the take-up.

It will be evident that this method of weaving headings may be applied to the weaving of handkerchiefs, table-cloths, checks, and other ornamental fabrics.

I claim as my invention—

1. The combination of a bobbin carrying a lap-weft thread, and mechanism for imparting a reciprocating motion to said bobbin, with a balanced counterpoise adapted to press on said lap-weft to insure its positive delivery, substantially as described.

2. The combination of a bobbin for the lap-weft, a rod carrying said bobbin, and mechanism for imparting a reciprocating motion to the said rod, with the frame, a counterpoise, $s$, and balanced or weighted lever $t$, adapted to act on said counterpoise, substantially as set forth.

3. The combination of a frame, counterpoise $s$, adapted to bear on the lap-weft thread, a sliding carriage, and a weighted lever, $t$, pivoted thereto and having a hooked end, with a vibrating lever, $v$, belt-shifting mechanism, and devices, substantially as described, whereby on the breakage of a thread said lever $v$ will cause the operation of the belt-shifting mechanism, as specified.

4. The combination of the take-up beam, gear-wheels, ratchet, and catch 2, and devices for reciprocating the catch, cam $y$, levers connecting it with the catch, and mechanism for rotating the cam, with let-off beam, friction device therefor, a hand-lever and levers connecting the latter with the friction devices, and the mechanism for operating the cam, substantially as described, whereby the friction may be applied to the let-off beam by the same movement which throws the cam-operating devices into gear, as set forth.

In testimony whereof I have signed my name to this specification in the presence of two subscribing witnesses.

CHRISTOPHER CROSS.

Witnesses:
CHARLES DAVIES,
JNO. HUGHES.